Dec. 22, 1959  L. E. AUSTIN ET AL  2,918,164
LOADER MECHANISM
Original Filed March 2, 1955  3 Sheets-Sheet 1
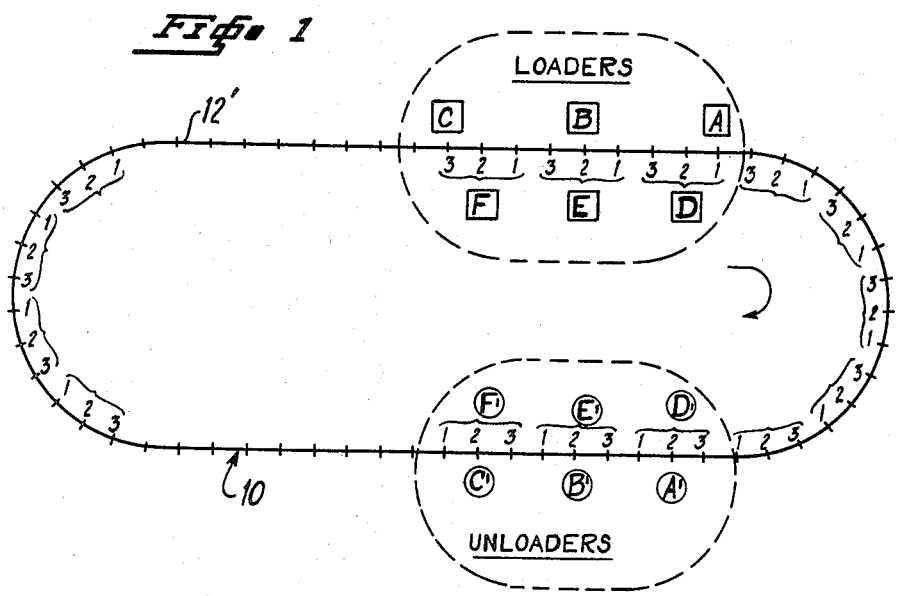
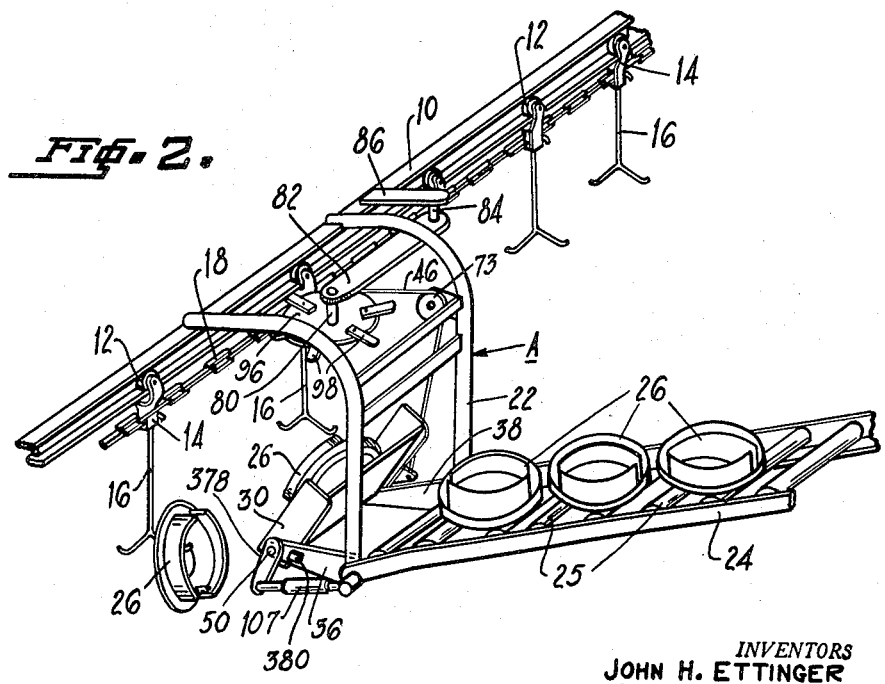
INVENTORS
JOHN H. ETTINGER
ARTHUR K. BROWN JR.
LEONARD E. AUSTIN

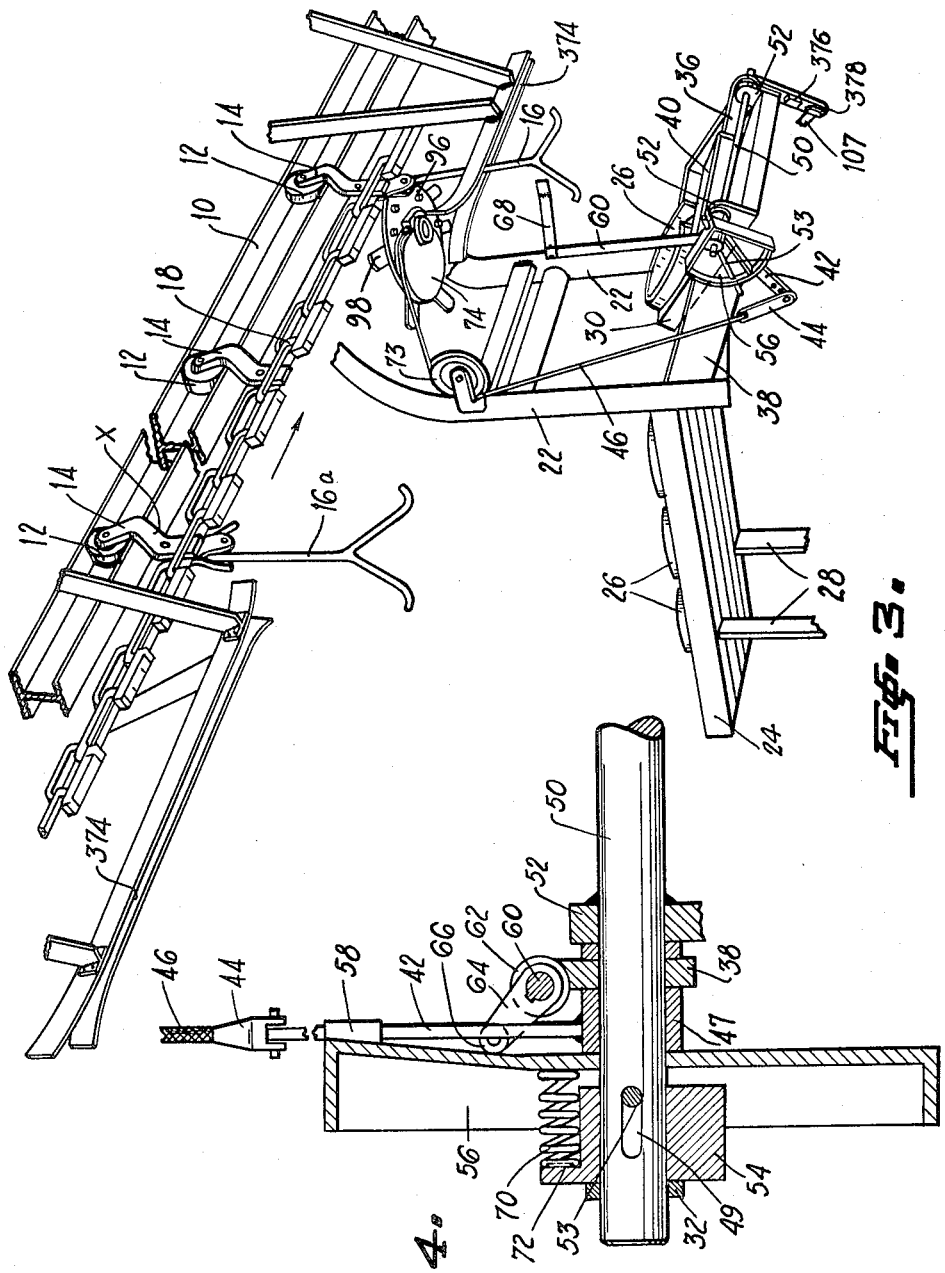

Dec. 22, 1959  L. E. AUSTIN ET AL  2,918,164
LOADER MECHANISM
Original Filed March 2, 1955  3 Sheets-Sheet 3

INVENTORS
JOHN H. ETTINGER
ARTHUR K. BROWN JR.
LEONARD E. AUSTIN

United States Patent Office 2,918,164
Patented Dec. 22, 1959

2,918,164

LOADER MECHANISM

Leonard E. Austin, Arthur K. Brown, Jr., and John H. Ettinger, South Bend, Ind., assignors to Bendix Aviation Corporation, South Bend, Ind., a corporation of Delaware Original application March 2, 1955, Serial No. 491,738, now Patent No. 2,849,101, dated August 26, 1958. Divided and this application July 27, 1956, Serial No. 600,476

2 Claims. (Cl. 198—177)

This invention, which is disclosed in our Austin et al. parent application Serial No. 491,738 filed March 2, 1955, now Patent No. 2,849,101, relates in general to means for selectively loading power operated conveyors and in particular to a means of this type for loading a plurality of different units, such as several types of automotive brakes onto the carriers of a conveyor. The instant application is accordingly a division of the above identified parent application.

There is a need in this art for an automatically operated mechanism operable to load a conveyor with a plurality of types of products, said products being then conveyed to the unloader mechanism which selects and deposits the product at a desired station. The mechanism described in this specification meets this need, for with said mechanism a plurality of types of brakes for other units are selectively loaded on a conveyor, and then transported to another place there to be selectively unloaded and deposited at the desired stations.

There is disclosed in this application a plurality of loader mechanisms together with corresponding unloader mechanisms, said mechanisms being cooperable with a single conveyor system, said system comprising an endless conveyor carrying a plurality of carrier units. However, the invention of this divisional application resides in the loader mechanism of this combination.

Accordingly, the principal object of our invention is to provide a relatively simple, compact and effective power operated loader mechanism for selectively loading, onto certain ones of a plurality of carrier units of a conveyor, units to be conveyed; for example, brake units of certain makes.

Another object of our invention is to include, in this loader mechanism, a mechanism which will automatically temporarily disable the loader mechanism if the carrier unit of the conveyor is already provided with the aforementioned brake unit or other unit being processed.

Yet another object of our invention is to provide a loader mechanism, comprising a plurality of conveyor driven loader units, for sequentially loading a plurality of different units upon the carrier units of a conveyor mechanism said operation being effective in a certain area of a manufacturing plant.

Another object of our invention is to provide, in combination with a power driven conveyor mechanism having a plurality of chain driven carrier units, a relatively simple power operated mechanism for loading a plurality of types of units onto said carrier units.

An object of our invention is, generally speaking, to provide a mechanism of the aforementioned type which shall be automatic in its entire operation and require no duty on the part of the attendant beyond placing the work, such as an automobile brake or other unit, upon a suitable work chute by which the work is fed into the mechanism; or if desired the work may be machine fed to the mechanism.

Yet another object of our invention is to provide a mechanism of the above mentioned character which is accurate and reliable in operation.

Yet another object of our invention is to provide a mechanism of the class referred to which is so constructed as to operate rapidly and efficiently with a minimum possibility of damage being done to parts of the mechanism; and requiring a minimum of attention by the attendant in charge.

Other objects and advantages of the present invention will become apparent during the following description of one embodiment of our invention, reference being had therein to the accompanying drawings, in which:

Figure 1 is a view disclosing, in a diagrammatic manner, the loader, unloader, conveyor mechanism described herein, the loader mechanism of which constitutes our invention;

Figure 2 discloses, in perspective, the loader unit of our invention the tray of said unit having been angularly moved to a position where it is about to drop a brake unit onto a hook of a carrier unit;

Figure 3 is another view, in perspective, disclosing details of the loader unit of our invention, an empty hook being shown approaching said unit;

Figure 4 is a view disclosing details of the loader unit disabling clutch mechanism of our invention.

Figure 5:
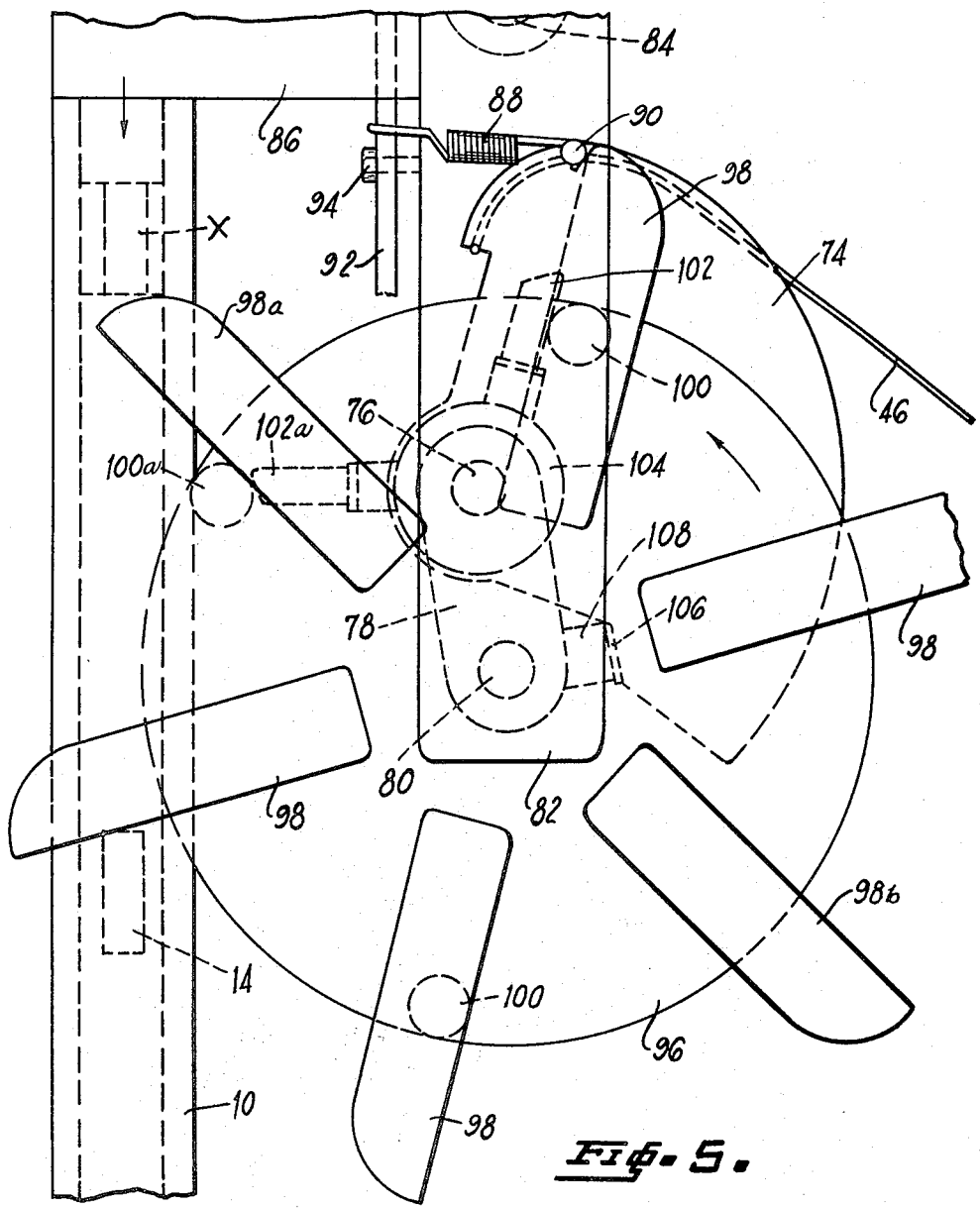
Figure 5 discloses details of the star wheel mechanism of the loader unit of our invention.

Referring now to the several figures of the drawings disclosing a preferred embodiment of our invention, there is diagrammatically disclosed in Figure 1 a loader, unloader and conveyor mechanism, the loader portion of which constitutes the essence of said invention. The conveyor system of this mechanism preferably includes an endless elliptically shaped I-beam track 10, Figures 2 and 3, which serves as a support for a plurality of equally or substantially equally spaced trolleys or carrier units each comprising a roller 12 to which is pivotally secured a hanger 14 and further comprising a hook member 16 secured to the lower end of the hanger, each hook having two prongs lying in a plane which is perpendicular or substantially perpendicular to the plane of that portion of the I-beam upon which the trolley is mounted. One of the two prongs projects outwardly of the track 10 and the other of the prongs projects inwardly all as is disclosed in Figures 2 and 3. The trolley units are preferably moved around the track 10 by a power operated endless chain 18 the hanger 14 of each unit extending through said chain.

Referring again to the diagrammatic showing of Figure 1, the trolleys, for convenience, are indicated by the numeral 12'. This figure also diagrammatically discloses the loader and unloader mechanism the loaders being indicated by the capital letters A to F inclusive each enclosed by a square; and corresponding unloader units are indicated by capital letters A' to F' inclusive each enclosed by a circle. These unloader units, all of which are alike, are not disclosed in detail in this specification inasmuch as the invention herein deals only with the loader mechanism. The unloader units are disclosed in detail in our aforementioned parent application Serial No. 491,738.

Each of the letters in Figure 1 also indicates a particular type of piece part, that is work unit being processed such as a particular type of automobile brake or other unit such as a container of some sort; and each of the loaders and unloaders is positioned in Figure 1 opposite a certain numbered trolley. The loader A, for example, will load a Ford brake on the first of a sequence of three trolleys passing this particular loader; and loader B will load say, a Chevrolet brake on trolley number two, the second trolley of the bracketed one to three sequence of trolleys of Figure 1. It is to be stressed here that the mechanism of our invention is not limited to the particular type of unit processed, that is loaded upon the conveyor as desired and then unloaded as desired. The endless conveyor may be located in a manufacturing plant or other building; or it may be located out of doors, there being no limitation as to the length of the conveyor, where it may be located, and what it may convey. In the embodiment of our invention disclosed in this application a plurality of types of automobile brakes are processed, the particular loading mechanism constituting our invention being constructed and operative to load several types of automotive brakes upon a conveyor. All of the loaders of the mechanism of Figure 1 are encircled by a dotted line, as are the unloaders; however, said loaders and unloaders are not necessarily so grouped together for they may be intermixed.

Discussing now a feature of our invention, to insure the desired efficiency and effectiveness of the mechanism, particularly the desired loading of the units transported, the conveyor mechanism includes a certain number of trolley units said number being a multiple of a certain number; however, the particular number of trolleys may if desired, be changed to correspond with a relatively slight change in the construction of the loader and unloaders, all of which will be brought out in the description to follow. Explaining the fact that the number of trolleys is a multiple of a certain number, if there are say three types of automobile brakes to be conveyed on the outwardly extending prongs of the hook 16 then the total number of trolley units is a multiple of the number three; and if, as diagrammatically disclosed in Figure 1, the inwardly extending prongs are also employed to transport three more types of brakes, then the number of trolley units remains a multiple of three.

As indicated above, a feature of our invention lies in the construction and operation of the mechanism of Figure 1 whereby the types of units to be loaded on the conveyor are loaded in a certain sequence. Thus with the embodiment of our invention disclosed in Figure 1, where three types of brake units are processed, the sequence is any one of one, two, three; two, three, one; or three, one, two, that is one sequence; and the construction and arrangement of the units of the mechanism is such that the unloading mechanism, the unloader units of which correspond to the loader units of the loading mechanism, operate to unload the products in the same sequence as said products are loaded. Thus, as is disclosed in Figure 1, the circled unloaders A, B and C unload the brakes in the same sequence that the squared loader units A, B and C load the brakes. The sequence may, as will be apparent from the description to follow, be some other number, say 4 or 6. It is to be particularly noted that in order to effect the desired unloading operation it is necessary that the loaders and unloaders of our invention operate in a certain sequence and that the number of trolleys be a multiple of said sequence number; and the number of types of work units which can be handled is also a multiple of the product of the sequence number times two if loaders and unloaders are placed both inside and outside the conveyor; that is opposite both prongs of the hooks.

Describing now one of the loader mechanisms of our invention, say loader A, Figure 1, two spaced apart steel tubes 22, curved in shape as disclosed in Figures 2 and 3, are secured at their upper ends to the track 10; and to their lower ends there is secured the lower end of an inclined track unit 24 having rollers 25 supporting brake units 26 of one type, say a Ford brake. As is disclosed in Figure 3, the inclined track 24 is supported adjacent its upper end by a support 28 there being two of said supports. The Ford brake units are placed on the track by an attendant or automatic means whereupon they are fed by gravity to a tray 30 pivotally mounted upon spaced apart inclined supports 36 and 38 respectively. These supports are fixedly secured at their upper ends to the tubes 22. As is made apparent from an inspection of Figures 2 and 3, the lowermost Ford brake unit leaves the track 24 and slides onto the tray 30; and shortly thereafter said tray is angularly rotated upwardly toward the hook 16 the weight of the brake unit then, in large measure, being taken by an angular shaped support member 40, Figure 3, secured to the base of the tray.

The tray 30 with its brake unit is angularly rotated upwardly by means of a crank 42, Figures 3 and 4, to which is adjustably and pivotally secured a strap 44. To this strap there is secured a cable 46 and actuating means therefor described hereinafter. The crank 42 is provided at one of its ends with a hub portion 47, Figure 4, rotatably sleeved over a rod 50. This rod extends through a hub member 54 sleeved over the rod; and a pin 53 extends through a slot, not shown, in the hub and through a slot 49 in said rod. The rod 50 is fixedly secured to arms 52 extending upwardly from and fixedly secured to the base of the tray 30 at its lower corners. One end of the rod 50 is pivotally mounted in the lower end of the support member 36 and the other end of said rod extends through and is pivotally mounted in the lower end of the support member. The pin 53 extends, at its ends, through the side flanges of a cup-shaped clutch member 56, said member being positioned alongside the crank 42. This disk like clutch member is provided with a flange 58 overlying the crank 42; and it is to be remembered that this crank is rotatably mounted on the rod 50. It will now be apparent that with the clutch member 56, positioned as disclosed in Figure 4 that is with the flange 58 overlying the crank 42, will, with upward rotation of said crank, Figure 3, serve to rotate the rod 50 about its axis; and this results in the upward angular movement of the tray 30.

The clutch member 56 and its flange 58 may, however, be angularly moved away from the crank 42 thereby rendering the crank 42 ineffective to actuate the tray; and this is effected by means of a rod 60 journalled at its lower end in a bearing 62 which is secured to the support 38 or otherwise fixedly secured in place. To the rod 60 there is keyed a crank 64 having a roller 66 on its outer end said roller bearing against the clutch member 56. To the upper end of the rod 60, Figure 3, there is secured a flange 68 positioned in the path of a brake unit, not shown, mounted on the outwardly extending prong of the hook 16. Should the approaching hook be loaded with a brake unit on its outwardly extending prong then this unit will strike the flange 68 thereby rotating the shaft 60; and this operation results in a counterclockwise rotation of the crank 64, Figure 4, to move the flange 58 out of the plane of the crank 42. In this operation the clutch member 56 is bodily moved to the left, Figure 4, against the pressure of a return spring 70 interposed between a flange 72 on the hub 54 and the body of said clutch member. In this operation a stop 32 secured to the rod 50, prevents a leftward movement of the hub 54.

The cable 46, secured at one of its ends to one end of the strap 44, passes over a sheave 73 mounted on one of the tubes 22; and said cable is secured at its other end, Figure 5, to a cam member 74. This cam member, shaped substantially as a quarter section of a disk, is pivotally mounted on a pin 76 which is fixedly secured to a generally rectangular shaped plate or strap 78. This strap is fixedly secured to a pin 80 which extends downwardly from one end of a rectangularly shaped support plate 82. This plate, which parallels the track 10, is pivotally mounted upon a pin 84 which is secured to the track by a strap 86. A spring 88, secured at one of its ends to a pin 90 extending from the plate 82 and at its other end to a support plate 92, serves to bias the plate 82 toward the track 10 and into abutment with an adjustable stop 94 secured to the plate 92.

A so-called star wheel or disk member 96 is rotatably sleeved over the pin 80 and lies between the support plate 82 and the cam 74. To the periphery of this star wheel there are secured equidistantly spaced fingers 98; and as disclosed in Figure 5, the outer cam shaped end of the fingers lies in the path of the movable hanger member 14 of the trolley unit. One or more pins 100 are secured to the lower side of the star wheel, said pins, with a rotation of said wheel, moving into contact with a pin 102 adjustably mounted on a boss 104 secured to the cam 74. Continued rotation of the star wheel will then serve to rotate the cam 74 to actuate the tray 30. The pin 100 finally leaves the pin 102 as indicated in dotted lines to the left in Figure 5. It is to be noted that pin 100 moves about the pin 80 as a center of rotation and that the pin 102 moves about the pin 76 as a center of rotation. It is to be noted, from an inspection of Figures 2 and 3, that the cam 74, star wheel 96 and parts associated therewith including the strap 78 and support plate 82, lie as a unit opposite the track 10 and immediately above the tray 30.

As indicated above, an important feature of our invention lies in the construction of the aforementioned cam and star wheel unit to provide means, cooperating with the tray 30 and cable 46, for loading a certain one of a sequence of hooks as the latter pass by the loader unit. In the embodiment of our invention disclosed in the several figures of the drawing, the particular sequence number selected is three to thereby effect the loading and unloading of three different types of brakes on each side of the conveyor, say a Ford front brake, a Chevrolet front brake and a Chrysler front brake on one side of the conveyor and corresponding rear brakes on the opposite side of the conveyor. It follows, therefore, that a sequence of three being selected, there are, necessarily, three fingers 98 on the star wheel; or a multiple of three; and there is a pin 100 for every three fingers. With the particular mechanism disclosed in Figure 5, there are six fingers on the star wheel; accordingly, there are two pins 100 on said wheel.

As noted above, it has been assumed that the loader mechanism described above is the loader indicated by the letter A in Figure 1 and it will further be assumed that said loader handles number one brake of the sequence, that is the Ford front brake; accordingly, when number one trolley of the sequence of trolleys, that is trolley X of Figure 5, strikes finger 98a of this figure then the star wheel is rotated counterclockwise in the direction of the arrow to bring a pin 100 into contact with the pin 102 to rotate the cam 74 counterclockwise and thereby operate the tray 30 to effect its brake loading operation. In this operation the brake is moved into the path of the approaching hook which then removes the brake from the tray. Incidently at the completion of this operation the aforementioned pin 100, by virtue of its rotation about the pin 80 and the rotation of the pin about the pin 76, has ridden over the top of the pin 102; all as indicated by the reference numerals 100a and 102a in Figure 5.

Continued movement of the chain driven trolleys results in the next two trolleys, in succession, striking their corresponding fingers on the star wheel; and when the next of the number one trolleys strikes a finger, indicated as finger 98b for the purpose of this description, then a pin 100 serves to contact the pin 102 to again operate the then loaded tray to effect another loading operation. After each loading operation the weight of the tray and parts connected thereto will return the cam 74 to the position disclosed in Figure 5, a flange 106 on the cam moving into abutment with a stop 108 secured to the strap 78; and a dash pot 107, Figure 2, secured to the lower end of a projection 378 secured to the shaft 50, serves to cushion this operation. If the star wheel should fail to rotate thereby jamming the mechanism, the entire star wheel 96, cam 74, and support plate 82 will, by virtue of the yielding of the spring 88, rotate counterclockwise as a unit about the pin 84. This latter operation may result in the operation of a mechanism, not shown, for stopping the conveyor until the defect is remedied. It is also to be noted, as indicated above, that three of the fingers 98 and one of the two pins 100 of the 6 finger 2 pin star wheel of Figure 5 may be omitted with a corresponding reduction in the diameter of the star wheel and the size of the cam and cooperating parts; and such a unit will cooperate just as well with the particular conveying mechanism of Figures 1, 2 and 3 to load the Ford front brakes on the number one trolley of said sequence.

There is thus provided, in the described loader unit A, Figure 1, a loader mechanism for loading a Ford front brake onto the outside hook of number one trolley of the sequence made up of three trolleys. The mechanism of loader B of Figure 1 preferably duplicates in construction the above described loader A and the arrangement of the parts is such that number two trolley, Figure 1, the outside hook prong of which is to receive the Chevrolet front brake, will serve to operate loader B to load this brake on said prong; and likewise the spacing, construction and arrangement of the parts is such that number three trolley, the outside hook prong of which is to receive the Chrysler front brake, serves to operate loader C to load the latter brake on the latter prong. Loaders D, E, and F, serving the inside prongs of the trolley hooks, also operate in the sequence as described above; and these loaders will handle three other types of brake units; and it is to be remembered that if any one of the unloader units A' to F' fail to unload their brakes, then the mechanism of Figures 4 and 3 operates to momentarily disable the corresponding loader mechanism.

The complete operation of the mechanism of our invention will now be described; and this description will cover parts of the mechanism not heretofore described. It is to be remembered that this description covers the operation of the above described loader A of Figure 1; and there is, of course, a concurrent operation of the unloader A'; however, this description will suffice for all of the loaders and unloaders of the mechanism inasmuch as all of the loaders are alike and all of the unloaders are alike. It is also to be remembered that both the loaders and unloaders operate in the same sequence.

Referring to Figures 2 and 3 of the drawings, it will be assumed that the conveyor is in operation, that is the chain 18 and parts connected thereto are being moved around the track 10 in the direction of the arrow in Figure 3. A hook, indicated as hook 16a for this description, is now approaching the loader A and this hook, immediately before it reaches the star wheel 96, enters a guide member 374 which is secured to the track 10. It will also be assumed that the hook 16a is mounted on the previously referred to hanger X, Figure 5; accordingly, when this hanger contacts the finger 98a the star wheel 96 is rotated to load a Ford front brake onto the outer prong of the hook 16a. In this operation the tray 30, as previously described, is angularly rotated toward the hook the brake being dumped onto the prong as it moves by the loader. The degree of this angular movement is limited by the operation of a stop 376, Figure 3, mounted on the projection 378 secured to the shaft 50. This stop contacts a stop 380, Figure 2, secured to the frame member 36. As previously described, if the hook approaching the loader is already loaded with a brake then the clutch mechanism 42, 56 and cooperating parts is operative to temporarily render the loader mechanism inoperative. The hook 16a having been loaded with a Ford front brake continues its movement around the conveyor until it reaches the Ford front brake unloader A' which then operates to unload said brake.

There is thus provided an efficient and effective mechanism for transporting a plurality of different types of units, such as brakes, from one location to another said units being loaded by power operated means onto a conveyor in a certain sequence and unloaded by power means in sequence such that like units only are unloaded at a particular unloading station. The conveyor, that is power operated loader units of our conveyor, loader, and unloader mechanism may be conveniently located in one area of say a manufacturing plant; and the power operated unloader units of our mechanism may be conveniently located in another area of said plant.

We claim:

1. A loader mechanism for use in a conveyor system having an endless conveyor comprising a plurality of trolleys each of said trolleys having secured thereto a hook adapted to carry a work unit to be conveyed, said loader mechanism including a support structure, a work unit supporting ramp secured to the support structure, a work unit supporting tray member pivotally mounted on the end of the ramp, and means, including a force transmitting mechanism comprising a rotatable member contacted by the portion of each trolley, for imparting an angular movement of the tray to transfer the work unit from the tray to the hook, said force transmitting means also including a clutch mechanism comprising a crank member actuated by a work unit mounted on one of said hooks and operative to momentarily disable the loader mechanism as the loaded hook passes by the mechanism.

2. A loader unit for use in a conveyor system said unit comprising a ramp adapted to support work units which are moved over the face of the ramp, an angularly movable work unit receiving tray, means for pivotally mounting said tray at the lower end of the ramp, means for imparting the angular movement of the tray with a work unit loaded thereon including a rotatable shaft, a crank rotatably mounted on the shaft, power operated means, including a cupshaped member pinned to the shaft and biased, by a spring, into engagement with a clutch operating member, for rotating the crank, and clutch means interconnecting the shaft and crank, said clutch means serving, with a certain operation thereof, to disconnect the power operated means from the crank and thereby temporarily disable the operation of the tray.

References Cited in the file of this patent
UNITED STATES PATENTS

| | | |
|---|---|---|
| 1,639,758 | Webb | Aug. 23, 1927 |
| 1,735,443 | Randles et al. | Nov. 12, 1929 |
| 1,762,304 | Morgan | June 10, 1930 |
| 1,895,046 | Morgan | Jan. 24, 1933 |
| 2,199,061 | Young et al. | Apr. 30, 1940 |
| 2,558,503 | Young | June 26, 1951 |

UNITED STATES PATENT OFFICE

CERTIFICATE OF CORRECTION

Patent No. 2,918,164             December 22, 1959

Leonard E. Austin et al.

It is hereby certified that error appears in the printed specification of the above numbered patent requiring correction and that the said Letters Patent should read as corrected below.

Column 8, line 11, after "means" strike out the comma and insert instead -- for rotating the crank, and clutch means --; lines 13 and 14, after "member," strike out "for rotating the crank, and clutch means".

Signed and sealed this 13th day of September 1960.

(SEAL)
Attest:

KARL H. AXLINE             ROBERT C. WATSON
Attesting Officer             Commissioner of Patents